United States Patent
Lu et al.

(10) Patent No.: US 11,871,294 B2
(45) Date of Patent: *Jan. 9, 2024

(54) FREQUENCY BAND HANDOVER IN DUAL-CONNECTIVITY SYSTEMS

(71) Applicant: T-Mobile USA, Inc., Bellevue, WA (US)

(72) Inventors: Kun Lu, Bellevue, WA (US); Egil Gronstad, Encinitas, CA (US); Alan Denis MacDonald, Bellevue, WA (US); Benjamin Sellers, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,474

(22) Filed: Jun. 14, 2022

(65) Prior Publication Data
US 2022/0312294 A1 Sep. 29, 2022

Related U.S. Application Data

(63) Continuation of application No. 16/846,142, filed on Apr. 10, 2020, now Pat. No. 11,368,895.

(60) Provisional application No. 62/965,242, filed on Jan. 24, 2020.

(51) Int. Cl.
*H04W 36/36* (2009.01)
*H04W 36/30* (2009.01)

(52) U.S. Cl.
CPC ........... *H04W 36/36* (2013.01); *H04W 36/30* (2013.01)

(58) Field of Classification Search
CPC ...... H04W 36/36; H04W 36/30; H04W 36/14
See application file for complete search history.

(56) References Cited

U.S. PATENT DOCUMENTS

| | | | |
|---|---|---|---|
| 2019/0268819 A1* | 8/2019 | Kim | H04W 72/04 |
| 2020/0145840 A1 | 5/2020 | Lei et al. | |
| 2020/0322855 A1 | 10/2020 | Dong et al. | |
| 2021/0044993 A1* | 2/2021 | Jha | H04L 5/0096 |

(Continued)

OTHER PUBLICATIONS

Office Action for U.S. Appl. No. 16/846,142, dated Aug. 31, 2021, Lu, "Frequency Band Handover in Dual-Connectivity Systems", 19 pages.

*Primary Examiner* — Charles N Appiah
*Assistant Examiner* — Frank E Donado
(74) *Attorney, Agent, or Firm* — Lee & Hayes, P.C.

(57) ABSTRACT

A cellular communication network may be configured to use a Long-Term Evolution (LTE) base station and a New Radio (NR) base station to implement a Non-Standalone Architecture (NSA) configuration, in an environment in which the NR base station uses multiple frequency bands that provide respective bandwidths. During an NSA connection with a mobile device, LTE signal strength is used as an indicator of whether the device is within the coverage area of a given NR frequency band. When the LTE signal strength indicates that the device has moved into the coverage area of a frequency band having a higher bandwidth than the currently active NR connection, the device is instructed to release and reestablish its NR connection in order to reconnect using the best available NR frequency band. LTE A1 and/or A5 event measurements may be used to evaluate signal strengths and as triggers for NR release/reestablish operations.

12 Claims, 4 Drawing Sheets

(56) References Cited

U.S. PATENT DOCUMENTS

2021/0051599 A1* 2/2021 Cha ...................... H04B 17/318
2021/0195439 A1* 6/2021 Prabhakar ............. H04W 24/02
2022/0046553 A1* 2/2022 Kim ..................... H04B 17/318

* cited by examiner

FREQUENCY BAND HANDOVER IN DUAL-CONNECTIVITY SYSTEMS

CROSS-REFERENCE TO RELATED APPLICATION

This patent application is a continuation of and claims priority to U.S. patent application Ser. No. 16/846,142, titled "FREQUENCY BAND HANDOVER IN DUAL-CONNECTIVITY SYSTEMS," filed Apr. 10, 2020, which is nonprovisional of and claims priority to U.S. Provisional Patent Application No. 62/965,242, titled "FREQUENCY BAND HANDOVER IN DUAL-CONNECTIVITY SYSTEMS," filed Jan. 24, 2020, both of which are fully incorporated herein by reference.

BACKGROUND

Cellular communication devices use network radio access technologies to communicate wirelessly with geographically distributed cellular base stations. Long-Term Evolution (LTE) is an example of a widely implemented radio access technology that is used in $4^{th}$-Generation (4G) communication systems. New Radio (NR) is a newer radio access technology that is used in $5^{th}$-Generation (5G) communication systems. Standards for LTE and NR radio access technologies have been developed by the 3rd Generation Partnership Project (3GPP) for use by wireless communication carriers.

A communication protocol defined by the 3GPP, referred to as Non-Standalone Architecture (NSA), specifies the simultaneous use of LTE and NR for communications between a mobile device and a communication network. Specifically, NSA uses dual connectivity, in which the mobile device uses both LTE and NR communication links for transmissions to and from corresponding 4G and 5G base stations. An LTE link is used for control-plane messaging and for user-plane communications. An NR link is used for additional user-plane bandwidth.

When using NSA, a 4G LTE base station (referred to as a Master eNodeB or MeNB) is associated with a 5G NR base station (referred to as a Secondary gNodeB or SgNB). In an NSA system, both the LTE base station and the NR base station support a 4G core network. However, control communications are between the 4G core network and the LTE base station, and the LTE base station is configured to communicate with and to control the NR base station.

In an NSA system, a mobile device initially connects to an LTE base station. When in a connected state, the LTE base station instructs the device to determine whether it is receiving a signal of sufficient strength from a specified NR base station. If the device finds a sufficiently strong signal from the NR base station, the LTE base station communicates with the mobile device and the NR base station to supply information needed to establish an NR connection between the mobile device and the NR base station. After this connection is established, the LTE base station forwards downstream user data to the NR base station for transmission to the mobile device. In certain situations, downstream user data may be transmitted over one or both of the LTE connection and the NR connection. Similarly, the mobile device transmits upstream user data to the NR base station using the NR connection. In certain situations, upstream user data may be transmitted over one or both LTE and NR connections.

There are several proposed configurations for NSA dual connectivity, and communications between the components may be implemented in various ways in other configurations.

More and more frequency bands are being added for use with NR radio access technologies. Examples include bands referred to as mmW (millimeter wave), N41, N2, N66, N25, N71, etc., with more bands planned for the future. These various NR frequency bands support different bandwidths. For example, mmW normally has a relatively wide bandwidth such as 100 MHz, 200 MHz, or 400 MHz, while N41 might have bandwidths such as 20 MHz, 40 MHz, 60 MHz, 80 MHz, or 100 MHz. Mid bands and low bands FDD such as n2, n66, n71, etc., may have even lower bandwidths such as 5 MHz, 10 MHz, 15 MHz, or 20 MHz. Higher bandwidths allow improvements in user throughput and user experience.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
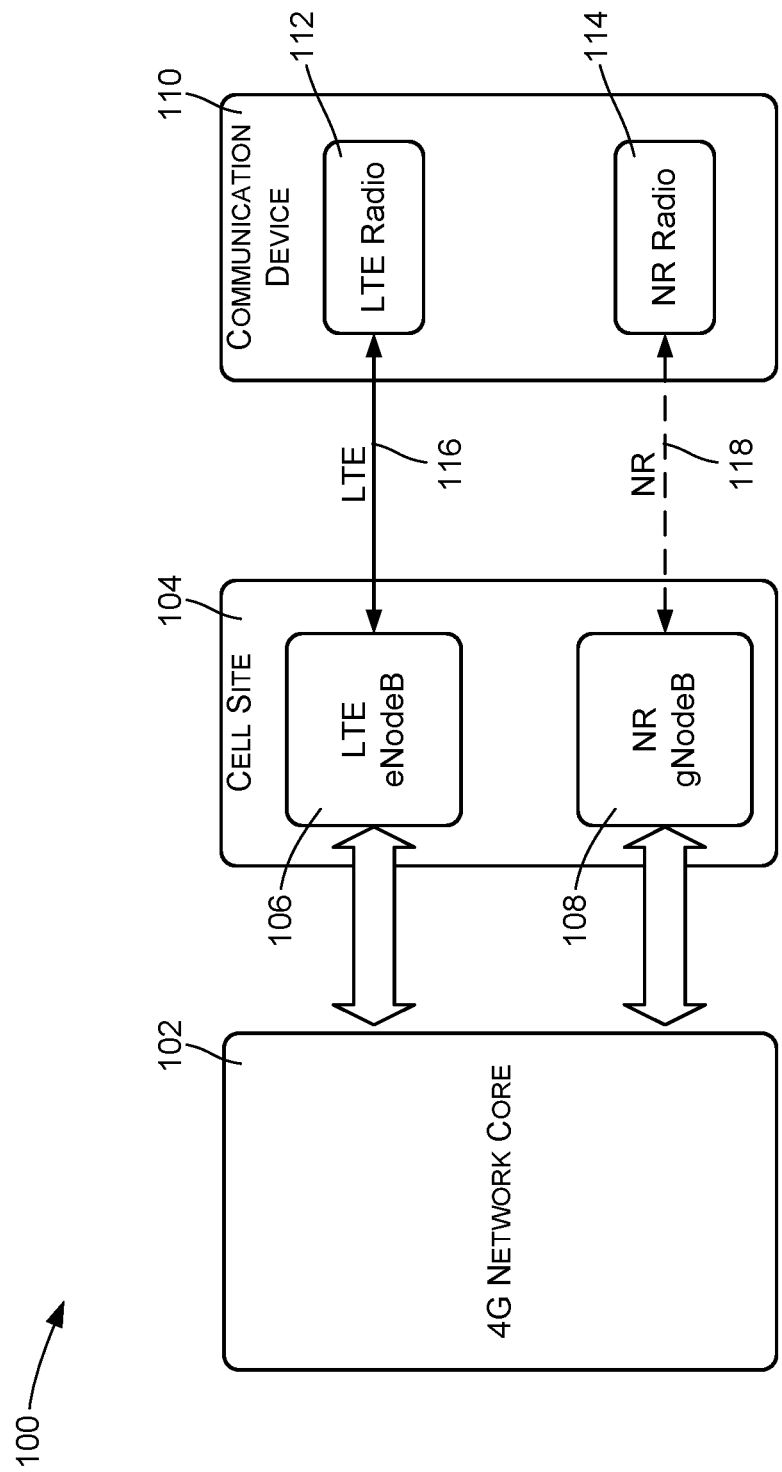
FIG. 1 is a block diagram showing relevant components of a communication network that supports Non-Standalone Architecture (NSA) dual connectivity based on $4^{th}$-Generation (4G) and $5^{th}$-Generation (5G) radio access technologies.

Described herein are techniques for triggering handovers to preferred frequency bands in a cellular network of a wireless communication provider that has geographic areas of $4^{th}$-Generation (4G) and $5^{th}$-Generation (5G) signal coverage. For example, the described techniques may be useful when a wireless communication device is in an area that uses 4G and 5G radio access technologies to implement non-standalone architecture (NSA) dual connectivity. In particular, the described techniques may be used to increase the likelihood that 5G New Radio (NR) components of a communication device are using preferred frequency bands that allow higher data bandwidths.

When using NSA, a dual connectivity data session between a cellular communication device and a communication network is implemented by a primary 4G Long-Term Evolution (LTE) data connection and a secondary 5G NR data connection. Initially, the device connects to an LTE base station. The LTE base station is configured to communicate with an associated NR base station in order to establish a secondary data connection between the device and the NR base station, using NR radio access technology.

The primary and secondary data connections are then used concurrently for communicating with the cellular communication device.

4G and 5G cellular communication networks may utilize a number of different frequency bands. A cellular communication device will in general enjoy better throughput when using higher-frequency bands, which typically allow higher bandwidths. However, these higher-frequency bands tend to have smaller coverage areas than lower-frequency bands. Accordingly, it may be desirable to change from one frequency band to another as the device moves about. When a device is very near a broadcast tower, it may be desirable to use a higher-frequency band with relatively high data bandwidths. At further distances from the tower, it may be desirable to use lower-frequency bands that have greater coverage range.

Unfortunately, current vendor implementations of communication device NR functionality do not support NR inter-frequency signal strength measurements that could, if available, be used to initiate these types of NR handovers based on NR signal strengths. That is, during connected mode the device NR components are not configured to detect and handover to better (i.e., higher bandwidth) NR frequency bands as those bands become available. Because of this, a moving device is not assured of using the best NR frequency band, particularly in situations in which the communication device is moving toward an NR-equipped cell tower into coverage areas of frequency bands having higher bandwidths. For example, suppose that a device establishes an NSA connection using an NR link in the N71 band, which has a relatively large coverage area. During use, the device may move toward the cell tower and into the relatively smaller coverage areas of higher-bandwidth frequency bands, such as the mmW, n41, and n66 frequency bands. Suppose, for example, that the device moves toward the cellular tower and into an area in which the mmW band is available for NR connections. In this situation, there is no mechanism for the system to detect that a more preferable NR frequency band has become available to the device. Accordingly, the device's NR link remains in the N71 band until released due to an event such as inactivity, even though better throughput could be achieved by handing over to a higher frequency band such as mmW.

In accordance with embodiments described herein, existing LTE inter-frequency measurement features are used to trigger reestablishment of the NR leg of an NSA connection, thereby allowing reselection of and handover to an NR frequency band based on current signal conditions. In some cases, this results in a selection of a frequency band that affords higher data throughput than the band that had previously been used for the NR leg of the NSA connection.

In some embodiments, the currently active LTE signal is measured and used to determine whether the device might be within the coverage area of a particular NR frequency band that has better bandwidth than the currently active NR frequency band. More specifically, the currently active LTE signal is compared to a predetermined threshold to determine whether the device is near enough the cellular tower so as to likely be within the coverage area of a given NR frequency band. Multiple thresholds may be specified, corresponding to the coverage areas of respective NR frequency bands, to detect movement of the device into these coverage areas.

In some embodiments, LTE signals other than the currently active LTE signal are measured and the measurements are used to determine whether the device is within the coverage area of a particular NR frequency band. To determine whether the device is within the coverage area of a particular NR frequency band, for example, the device measures the strength of an LTE reference signal that is in an LTE frequency band coinciding with the particular NR frequency band. The measured LTE signal strength is compared to a signal strength threshold to predict whether the corresponding NR signal strength in the particular NR frequency band is sufficient to support NR communications.

The LTE measurements are performed using measurement reporting functionality that is supported by LTE devices. More specifically, LTE components of the device periodically measure signal strengths of specified LTE signals and generate signal event notifications in response to various events relating to the signal strengths. For example, the device may generate an LTE "A1" event when the signal strength of the currently serving cell is greater than a configurable threshold. Similarly, the device may generate what is referred to as an "A5" event when the signal strength of the currently serving LTE cell is less than a first configurable threshold and the signal strength available from a different frequency band cell is greater than a second configurable threshold. When generated, notifications of A1 or A5 events such as this are sent to the LTE network, and the LTE network may respond as appropriate. For example, the LTE network may instruct the device to switch to a different cell that has a better measured signal strength than the current cell.

In accordance with certain embodiments described herein, LTE A5 measurements are made by a cellular communication device during an active NSA connection that has been established using a first LTE frequency band and a first NR frequency band. Specifically, A5 measurements are configured to measure signal strength of an LTE signal in a second LTE frequency band, other than the currently active LTE frequency band, so that an LTE A5 event is generated when the signal strength in this second LTE frequency band is greater than a predetermined threshold. The second LTE frequency band in this scenario is selected as one that corresponds in frequency to an NR frequency band having a higher bandwidth than the currently active NR frequency band. As an example, assume that the currently active NR frequency band is the N71 frequency band. In this case, the second LTE frequency band may be the B41 frequency band and the higher-bandwidth NR frequency band may be the N41 frequency band, which has a higher bandwidth than the currently active NR frequency band N71.

In response to receiving the LTE A5 event, the system instructs the communication device to release and reestablish its NSA NR connection, with preset NR frequency priority, one example as while higher the frequency band is, the higher predefined priority is. This allows the communication device, while reconnecting, to select the currently available NR frequency band having the highest bandwidth, which in the given example is likely to be the N41 frequency band. Using this technique, the communication device is able to switch to higher-bandwidth NR frequency bands despite the unavailability of NR inter-frequency measurements and alerts.

Additionally, or alternatively, A1 events may be used to trigger a handover to an NR frequency band having higher signal strength than the NR frequency band currently being used. Using this technique, A1 measurements may be configured to measure signal strength of the currently active LTE signal as an indirect indicator of the strength of a signal in a second NR frequency band, and to generate an A1 event when the signal strength of the current LTE signal exceeds a predetermined threshold. The threshold is set to an LTE signal strength value that is great enough to indicate that the communication device is within an estimated proximity of the cellular tower and therefore likely to be within the coverage area of the higher-bandwidth NR frequency band. This technique relies on the assumption that the LTE signal strength increases as the communication device moves nearer the cellular tower. Different LTE signal strength thresholds may be used to detect coverage of different NR frequency bands.

These techniques allow an NSA connection to dynamically switch to NR frequency bands having higher frequencies with higher bandwidths with higher priority setting as the communication device moves toward a cellular tower that supports both LTE and NR communications. This is accomplished without NR inter-frequency measurements. The described techniques improve user experience by providing the highest available data transfer speeds.

Although the techniques are described in the context of 4G and 5G networks, the techniques described herein may also be used with different network types, standards, and technologies. That is, the techniques may be used more generally for first and second wireless communication networks, where a 4G network is an example of the first wireless communication network and a 5G network is an example of the second wireless communication network.

FIG. 1 illustrates relevant high-level components of a cellular communication system 100 such as might be implemented by a cellular communications provider. The components shown in FIG. 1 may be used to implement dual connectivity, for use in a Non-Standalone Architecture (NSA) configuration. When using NSA, a communication device uses both a Long-Term Evolution (LTE) carrier and a New Radio (NR) carrier for uplink and downlink transmissions to and from respective LTE and NR base stations. The LTE carrier is used for control-plane messaging and for user-plane communications. The NR carrier is used for additional user-plane bandwidth.

For purposes of discussion, a $4^{th}$-Generation (4G) or LTE component is a component that performs according to 4G or LTE communications standards. A 4G or LTE signal or communication is a signal or communication that accords with 4G or LTE communications standards. A $5^{th}$-Generation (5G) or NR component is a component that performs according to 5G or NR communications standards. A 5G or NR signal or communication is a signal or communication that accords with 5G or NR communications standards.

The communication system 100 has a 4G network core 102. The communication system 100 also has multiple cellular sites 104, only one of which is shown in FIG. 1 for purposes of discussion. Although not shown, some networks may include a 5G network core.

The illustrated cellular site 104 has collocated 4G and 5G cellular access points, and therefore supports both 4G and 5G communications. The 4G access point is implemented as an LTE base station 106, also referred to as an eNodeB, a master eNodeB, or a master base station. The 4G access point is associated with a 5G access point, which is implemented as an NR base station 108. The NR base station 108 may also be referred to as a gNodeB, a secondary gNodeB, or a secondary base station. The 4G network core 102 communicates with the LTE base station 106 and the NR base station 108. When using NSA, radio communications are controlled by the LTE master base station. Other communication paths may be used in other embodiments.

FIG. 1 shows a single cellular communication device 110, which is one of many such devices that are configured for use with the communication system 100. In the described embodiment, the communication device 110 supports both 4G LTE and 5G NR networks and communications. Accordingly, the communication device 110 has an LTE radio 112 that communicates wirelessly with the LTE base station 106 of the cellular site 104 and an NR radio 114 that communicates wirelessly with the NR base station 108 of the cellular site 104.

The communication device 110 may comprise any of various types of wireless cellular communication devices that are capable of wireless data and/or voice communications, including smartphones and other mobile devices, "Internet-of-Things" (IoT) devices, smarthome devices, computers, wearable devices, entertainment devices, industrial control equipment, etc. In some environments, the communication device 110 may be referred to as a User Equipment (UE) or Mobile Station (MS).

The LTE base station 106 and the NR base station 108 in the examples described below are associated with each other by being collocated at a single cellular site. Although only a single pair of LTE and NR base stations is shown in FIG. 1, the system 100 may include multiple cellular sites.

The communication device 110 may communicate through either or both of the LTE base station 106 and the NR base station 108. In some cases or embodiments, the communication device 110 may support dual connectivity communications, in which a single communication session concurrently uses both a 4G connection and a 5G connection. More specifically, the communication device 110 may operate using what is referred to as a Non-Standalone Architecture (NSA), using 5G NR radio technologies to augment 4G LTE communication capabilities. When using NSA, the communication device 110 might use both an LTE carrier 116 and an NR carrier 118 for downlink data reception and uplink data transmissions. The LTE carrier 116 is used for control-plane messaging and for user-plane communications. The NR carrier 118 is used for additional user-plane bandwidth. The NR carrier 118 is illustrated as a dashed line to indicate its secondary nature relative to the LTE carrier 116. The following discussion will assume that the communication device 110 is in connected mode and using NSA.

The LTE and NR carriers 116 and 118 are implemented using signals having frequencies that are in respective frequency bands. The LTE frequency band used by the LTE carrier 116 at any given time will be referred to as the active LTE frequency band. The NR frequency band used by the NR carrier 118 at any given time will be referred to as the active NR frequency band. It is assumed in the following examples that each of the LTE and NR base stations 106 and 108 supports multiple frequency bands. That is, each base station implements multiple cells, which correspond respectively to different frequency bands.

Figure 2:
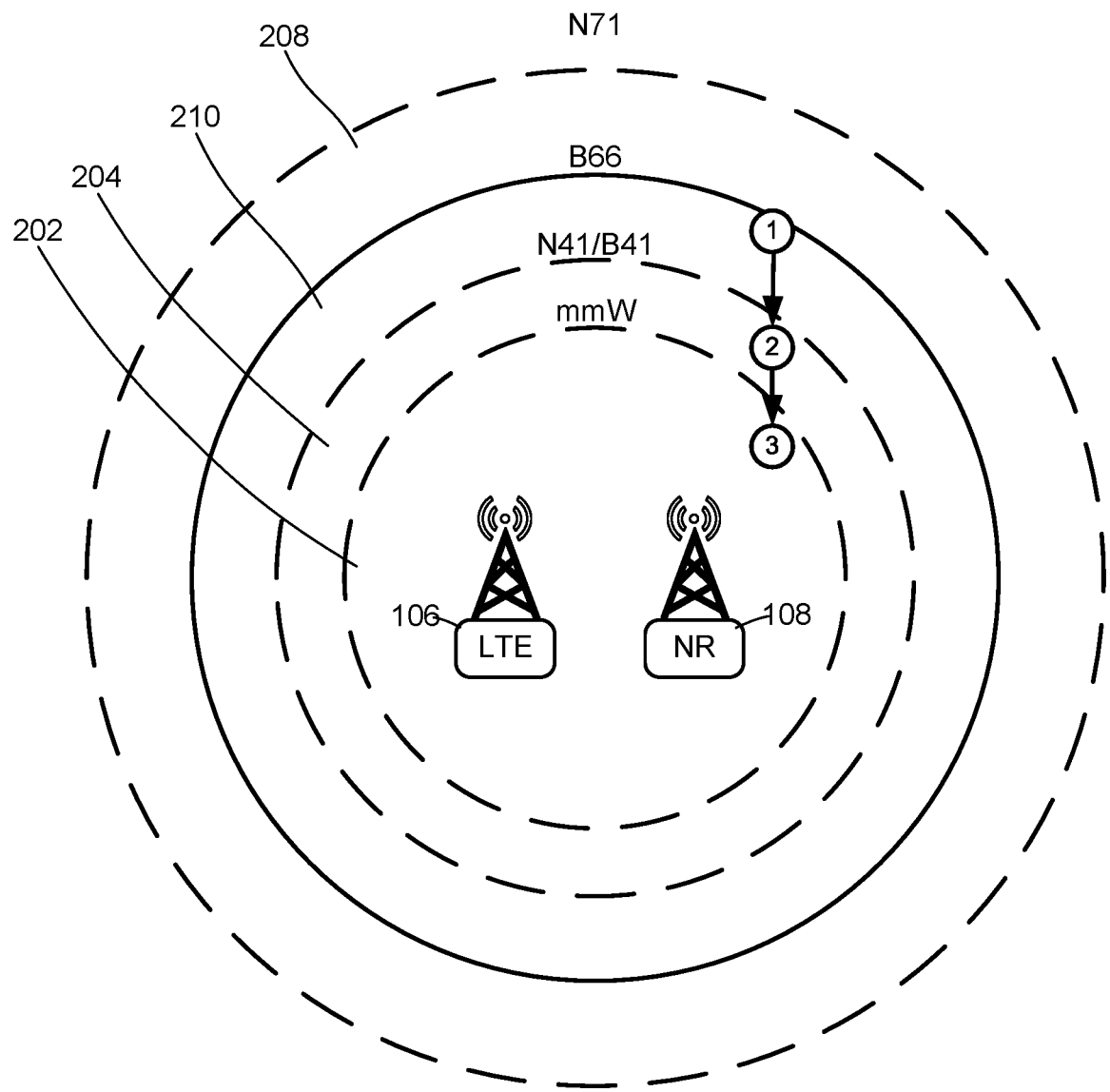
FIG. 2 is a diagram illustrating an example of different geographic coverage areas corresponding to different frequency bandwidths of a cellular communication system.

FIG. 2 illustrates example coverage areas of different frequency bands that may be used by the LTE and NR base stations 106 and 108. Coverage areas are represented in FIG. 2 as circles, although in practice the coverage areas might be shaped differently. The NR base station 108 in this example supports NR bands N71, N41, and mmW, in order of increasing signal frequency. Coverage areas of these bands are illustrated as dashed circles. The mmW band has a coverage area 202. The N41 band has a larger coverage area 204. The N71 band has an even larger coverage area 208.

The different NR bands have different bandwidths. Generally, higher-frequency and higher-bandwidth bands have smaller coverage areas while lower-frequency and lower-bandwidth bands have larger coverage areas. In this example, the mmW band has the highest bandwidth and the smallest coverage area. The N71 band has the largest coverage area and potentially the lowest bandwidth due to the scarcity of low-band resources.

As used herein, the bandwidth of a frequency band is the highest data transfer rate that is available to a device when using a communication signal in that frequency band. A carrier or connection is said to use a frequency band when the carrier or connection is based on a radio signal having a frequency within that frequency band. The frequency band that is being used for an active connection is referred to as the active frequency band.

The LTE base station 106 may also support multiple frequency bands, some of which may overlap or otherwise correspond to the frequency bands of the NR base station 108. For example, the LTE base station 106 may support the B41 frequency band, which may cover the same frequency range and has roughly the same coverage area 204 as the N41 frequency band. In example of FIG. 1, the LTE base station 106 also supports the B66 band, which is assumed in following examples to be used for LTE anchor connections. That is, NSA connections are set up to use the B66 band for LTE communications. The B66 band has a coverage area 210.

FIG. 2 illustrates a scenario in which a wireless communication device, whose position is represented in FIG. 2 as a series of small numbered circles, is moving toward the first and second collocated base stations 106 and 108. An NSA connection is initially set up at position 1. It is assumed for purposes of description that this initial connection uses the B66 band for LTE communications and the N71 band for NR communications. As the communication device moves inward toward the base stations 106 and 108, to position "2", it may be desirable for the NR connection to switch from the N71 band to the N41 band in order to enjoy the higher bandwidth of the N41 band. Similarly, moving inward to position 3 should result in the NR connection switching to the mmW band.

In some embodiments, LTE A1 event measurements may be performed by the communication device 110 to estimate when the communication device 110 is within any given NR coverage area. The A1 event measurement can be configured to generate a notification when the signal strength of the currently active LTE connection exceeds a given threshold, indicating that the communication device 110 is nearing the LTE and NR base stations 106 and 108. For example, A1 measurements may be used with a threshold value equal to the anticipated LTE signal strength at the point where the communication device 110 is at a distance from the LTE base station 106 that is within the N41 coverage area 204. At another time, the A1 threshold may be set to a value equal to the anticipated LTE signal strength when the communication device 110 is within the mmW coverage area 202.

More specifically, when the communication device 110 is at position 1, using the N71 band for the NR connection, the A1 threshold is set to an LTE signal strength value corresponding to the next-higher NR frequency band, which in this case is the N41 band. When the communication device 110 is at position 2, using the N41 band for the NR connection, the A1 threshold is set to an LTE signal strength value corresponding to the next-higher NR frequency band, which in this case is the mmW frequency band.

In response to an A1 event, the NR base station 108 and/or device 110 are instructed to release and then reestablish the active NR connection. When reestablishing the NR connection, the communication device 110 performs various NR signal measurements to determine the best (i.e., highest bandwidth) available NR frequency band. When the communication device is at position 2, N41 is the best available NR frequency band. When the communication device 110 is at position 3, the mmW band is the best available NR frequency band. Selection of the best NR frequency band can be achieved by setting different priorities for different NR frequency bands. For example, higher frequency bands may be assigned higher priority settings.

In some embodiments, LTE A5 event measurements, rather than A1 event measurements, may be used to estimate when the communication device is within any of the NR coverage areas. In LTE systems, an LTE A5 event is generated when the signal strength of the currently active LTE signal is less than a first A5 threshold and the strength of a different LTE signal is greater than a second A5 threshold. By setting the first A5 threshold to a high, unobtainable value, the A5 event can be configured to provide a notification whenever the signal strength of the different LTE signal is greater than the second A5 threshold.

In described embodiments, the LTE A5 event is configured to be based on the strength of a reference signal in a referenced LTE frequency band that corresponds in frequency to the NR frequency band that has the next higher frequency and bandwidth in relation to the currently active NR frequency band. For purposes of this measurement, the first A5 threshold is set to a very high value, and the second threshold is set to a value corresponding to the signal strength needed to support a data connection. When configured in this manner, the LTE A5 event is generated when the reference signal of the referenced LTE frequency band exceeds the second A5 threshold. The A5 event is then interpreted as indicating that the NR frequency band corresponding to the referenced LTE band is likely available for use.

In a described embodiment, LTE A1 and/or A5 events, configured in this manner, are used to trigger NR components of the NR base station 108 and device 110 to release the current NR connection and to establish a new NR connection. Various types of selection criteria may be used for selecting an NR frequency band when reestablishing the NR connection. In some cases, NR frequency bands are scanned in a prioritized manner so that higher-bandwidth bands are evaluated first. More specifically, the cellular network may first instruct the device 110 to evaluate signal strength of a reference signal in a first frequency band having a relatively high bandwidth, and to establish an NR connection using this frequency band if the signal strength in the frequency band is sufficient. Otherwise, if the first frequency band is not available at a sufficient signal strength, the cellular network may instruct the device 110 to evaluate signal strength of a reference signal in a second NR frequency band having a relatively lower bandwidth, and to establish an NR connection using the second NR frequency band if a signal of sufficient strength is found in that frequency band. This process may be repeated for frequency bands having successively decreasing bandwidths until a qualifying (i.e., a signal of sufficient strength) NR frequency band is identified.

The described techniques provide a mechanism for handing over between NR frequency bands in response to changing signal conditions. In particular, an inter-frequency NR change is triggered in response to changing LTE signal conditions such as indicated by LTE A5 events, LTE A1 events, and/or other detected LTE inter-frequency events. This is particularly useful as a communication device moves into successively smaller coverage areas of respective higher-frequency NR frequency bands, allowing the communication device to take advantage of the higher throughputs afforded by these frequency bands.

Figure 3:
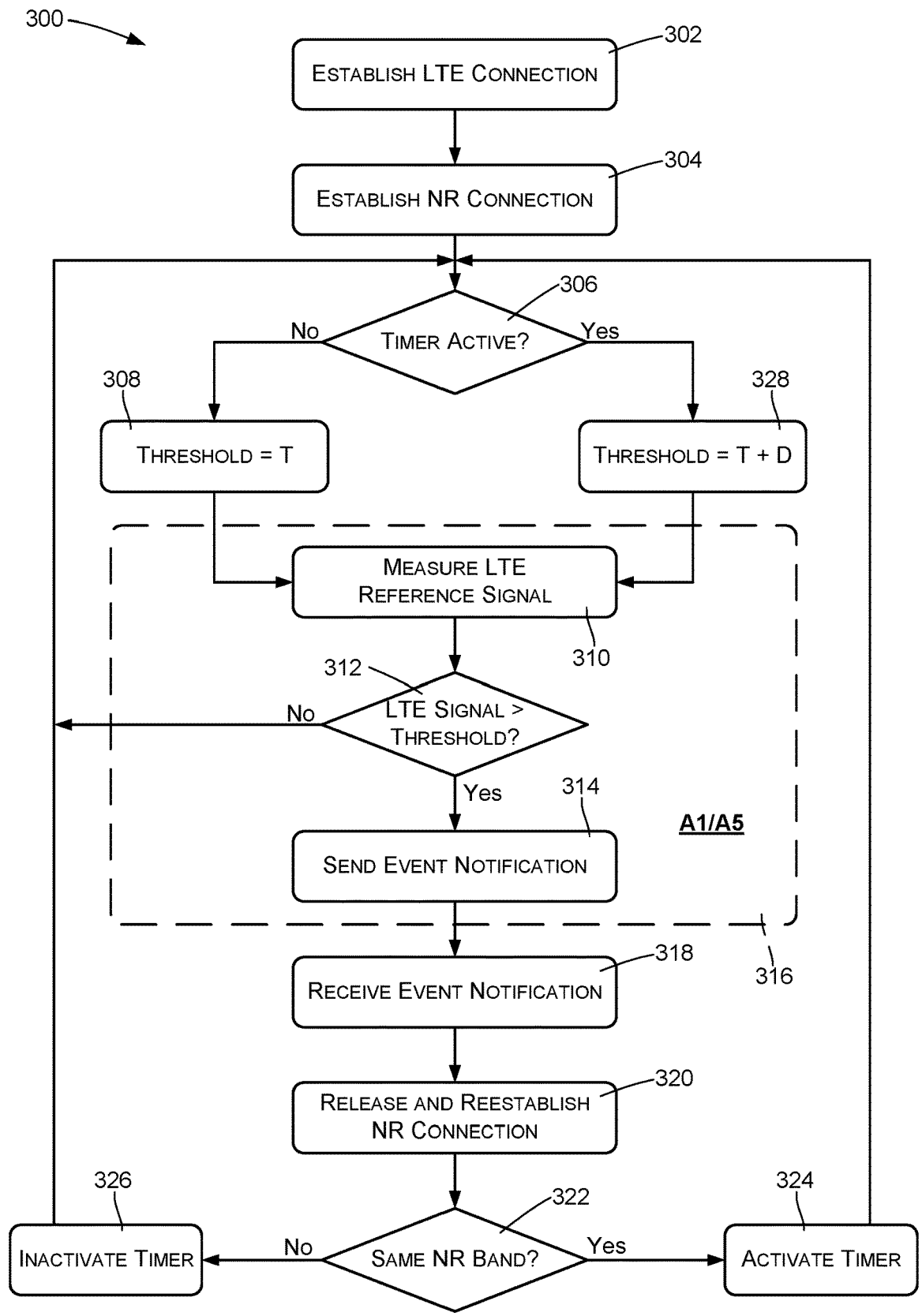
FIG. 3 is a flow diagram illustrating an example method that may be performed to implement 5G New Radio (NR) handovers during NSA connections.

FIG. 3 illustrates an example method 300 that may be performed to set up and maintain a data communication session with the cellular communication device 110 when using dual connectivity, such as when operating in an NSA mode of a hybrid 4G/5G communication network. The example method 300 will be described in the context of FIG. 1, although the method is also applicable in other environments.

An action 302 comprises establishing a primary data connection, using a first radio access technology such as LTE, between the cellular communication device 110 and the LTE base station 106. The LTE data connection 116 of FIG. 1 is an example of such a primary data connection. The LTE data connection 116 may be established by the LTE base station 106 in accordance with 3GPP 4G LTE specifications, in an appropriate LTE frequency band that will be referred to herein as the LTE anchor frequency band. For example, the frequency band B66 may be used as the anchor frequency band. The LTE frequency band being used by the device 110 for the LTE data connection 116 will also be referred to as the active LTE frequency band.

An action 304 comprises establishing a secondary data connection, using a second radio access technology such as 5G NR, between the cellular communication device and the NR base station 108. The NR data connection 118 of FIG. 1 is an example of such a second data connection. The NR data connection 118 serves as a secondary data connection when using NSA dual connectivity. NR connections such as this are implemented in accordance with 3GPP 5G NR and NSA specifications, in an appropriate NR frequency band. The action 304 may include configuring the NR base station 108 to transmit and receive data, using the NR data connection 118, as part of an NSA data session with the device 110. The NR frequency band being used by the device 110 for the NR data connection 118 will be referred to herein as the active NR frequency band.

When establishing the NR data connection 118, the device 110 may scan NR reference signals in multiple NR frequency bands in order to identify the best available NR frequency band, such as a frequency band that provides the greatest bandwidth among the NR frequency bands whose reference signals have acceptable signal strengths. For example, the device 110 may first determine whether a reference signal in the mmW band has an acceptable signal strength and, if so, may establish the NR data connection 118 using that frequency band. Otherwise, the device 110 may then check the frequency band having the next lower bandwidth, which in the example of FIG. 2 would be the N41 band. The device 110 successively scans reference signals of the frequency bands in order of decreasing bandwidth until finding a frequency band having a reference signal with an acceptable signal strength. When the device 110 finds a frequency band whose reference signal has an acceptable signal strength, the NR connection 118 is established using a carrier in this frequency band and the device 110 does not scan any lower-bandwidth frequency bands.

An action 306 relates to a countdown timer that may be used in some embodiments to prevent repeated unsuccessful attempts of NR connection handovers, and which will be discussed in more detail at a later point in this description. Initially, it can be assumed that there is no active timer and that the action 308 is performed of setting an LTE signal strength threshold to a value T. As will be described in more detail below, the LTE signal strength threshold is set to a value that corresponds to an expected minimum LTE signal strength when the device 110 enters and/or is within the coverage area of a given NR frequency band.

An action 310 comprises measuring the strength of an LTE reference signal. For example, the action 310 may comprise measuring the reference signal received power (RSRP) of an LTE reference signal in either the active LTE frequency band or another LTE frequency band, as will be described below.

An action 312 comprises determining whether the measured LTE signal strength exceeds the LTE signal strength threshold. If the measured LTE signal strength exceeds or otherwise satisfies the LTE signal strength threshold, an action 314 is performed of sending a signal event notification to the LTE base station 106.

The actions 310, 312, and 314 may in some embodiments be implemented by LTE A1 and/or A5 measurements performed by the device 110. A1 and A5 measurements, grouped in FIG. 3 by a dashed box and referenced by the numeral 316, are used in LTE systems for facilitating handovers between LTE base stations. The device 110 can be configured by the LTE base station 106 to perform A1 and/or A5 measurements in accordance with specified parameters. Specifically, the LTE base station 106 specifies the signal strength threshold(s) used by the A1/A5 measurements and in the case of A5 measurements can also specify the LTE frequency band in which measurements will be performed. The purpose of these measurements in this context is to estimate the current signal strength of a signal in a particular NR frequency band, and to generate an event notification to the LTE base station 106 when the estimated NR signal strength is sufficient to support an NR data connection.

In some embodiments, A1 measurements are used to evaluate likely signal strength of different NR frequency bands based on a signal strength that is observed in the active LTE frequency band. More specifically, a different LTE signal strength threshold (i.e., the threshold T) may be specified for each of multiple NR frequency bands. When the measured signal strength of the current LTE connection 116 exceeds the threshold that has been specified for a particular NR frequency band, the A1 event is generated and that NR frequency band is assumed to be of a sufficient signal strength to support an NR connection.

At any given time, the signal strength threshold T used for A1 measurements may be selected based on which of the NR frequency bands is currently active (i.e., the NR frequency band currently being used for the NSA connection). For a particular active NR frequency band, an A1 LTE signal strength threshold corresponding to the NR frequency band having the next highest bandwidth is selected. As an example, suppose that the device 110 is in position 2 of FIG. 2, and is using the N41 frequency band. In this situation, the A1 LTE signal strength threshold is set to a value that is likely to be present when the device 110 moves geographically into the mmW frequency band, such as to position 3 of FIG. 2. This results in an A1 event notification being produced each time the device 110 moves into the coverage area of an NR band having a higher bandwidth than the currently active NR frequency band. The actual threshold values for the different NR frequency bands may be determined by experimentation and observation of existing installations.

In some embodiments, A5 measurements may be used to evaluate likely signal strength of different NR frequency bands based on LTE signal strengths of reference signals in corresponding LTE frequency bands, including the active LTE frequency band and other LTE frequency bands. A5 measurements are based on a first A5 threshold and a second A5 threshold. The A5 event notification is generated when (a) the signal strength of the currently active LTE connection is less than the first A5 threshold and the signal strength observed from a specified "neighboring" cell is greater than the second A5 threshold. In accordance with the techniques described herein, the first A5 threshold is set to a value that is higher than any expected LTE signal strength so that the first threshold is always satisfied. That is, the signal strength of the currently active LTE connection will always be less than the first A5 threshold. As a result of this, the A5 notification will be generated whenever a reference signal of the "neighboring" cell is greater than the second A5 threshold, without regard for the signal strength of the active LTE frequency band.

In the described environment, the different LTE frequency bands supported by the LTE base station 106 are considered as being provided by different cells, and the A5 measurement can be configured to measure signal strength in any of these LTE frequency bands. In accordance with the techniques described herein, the LTE frequency band to be evaluated against the second A5 threshold is selected based on the currently active NR frequency band. For any particular active NR frequency band, the NR frequency band having the next-highest bandwidth is identified. The LTE frequency band corresponding to this next-higher NR frequency band is then specified as the LTE frequency band to which the second A5 threshold is to be compared. The LTE frequency band is selected such that it and the next-highest NR frequency band span at least a common frequency range. In some cases, the selected LTE frequency band may span the same frequency range as the next-higher NR frequency band.

As an example, suppose that the device 110 is in position 1 of FIG. 2 and is using the N71 frequency band for an NR connection. In this situation, the N41 band is the next-higher bandwidth frequency band. The B41 band is the corresponding LTE frequency band and is specified as the subject of the LTE A5 measurement. The second A5 threshold is set to an LTE signal strength value which, if exceeded, indicates that the signal strength in the N41 frequency band is likely sufficient to support an NR connection. Accordingly, as the device 110 moves into the N41 coverage area 210, an A5 event is generated based on the strength of an LTE reference signal in the LTE B41 frequency band. Using this technique, an A5 event is generated each time the device 110 moves into the coverage area of an NR band having a higher bandwidth than the currently active NR frequency band.

An action 318, performed by the LTE base station 106, comprises receiving an LTE A1 or LTE A5 signal event notification from the device 110, which has been generated by the device 110 as described above.

In response to receiving the A1 or A5 signal event notification, an action 320 is performed of first releasing the current NR connection 118 and then reestablishing the NR connection 118. For purposes of discussion, the combination of these actions will be described as a release/reestablish operation 320.

The release/reestablish operation 320 includes an action of identifying a new NR frequency band that is (a) currently available for use by the device 110 and (b) has a greater bandwidth than the original, previously active NR frequency band. This can be achieved by initiating a new B1 measurement procedure, in which priority is given to higher-bandwidth NR frequency bands so that the reestablished NR connection uses the highest-bandwidth frequency band that is currently available to the device 110. In some embodiments, this may be accomplished by instructing the cellular communication device to search, using B1 measurement techniques, for an NR signal in a sequence of NR frequency bands having successively decreasing bandwidths. More specifically, the device 110 performs signal measurements of reference signals in different NR frequency bands, in a prioritized sequence of NR frequency bands in which higher-frequency and higher-bandwidth frequency bands are prioritized over lower-frequency and lower-bandwidth frequency bands. The device 110 reestablishes the NR connection using the first NR frequency band in the sequence that has a corresponding NR reference signal of an acceptable signal strength.

In some embodiments, an action 322 may be performed to reduce frequent NR connection release/reestablish operations, which might otherwise occur when the release/reestablish operation 320 does not result in a changed NR frequency band. For example, in some cases the action 320 may comprise releasing an NR connection that has been using a particular frequency band, and then reconnecting using that same NR frequency band. This might happen particularly when using A1 measurements because the A1 thresholds are only indirectly related to NR signal strengths in the various NR frequency bands.

The action 322 comprises determining whether the release/reestablish operation 320 resulted in a change in the active NR frequency band. If there was no change, and the reestablished NR connection uses the same frequency band as the released NR connection, an action 324 is performed of activating a countdown timer. If there has been a change in the NR frequency band, an action 326 is performed of inactivating the countdown timer. The countdown timer is a logical construct or flag that when activated remains active or "true" for a configurable time or until otherwise inactivated. The countdown timer is initiated when the release/reestablish operation 320 results in selection of the same frequency band as was being used when the secondary connection was released. As will be discussed, the countdown timer prevents any subsequent releasing of the secondary data connection for at least a predetermined time period to prevent repeated unsuccessful attempts to move to a higher bandwidth frequency band.

Returning to the action 306, the signal strength threshold is set to a different value when the countdown timer is active. If the countdown timer is inactive, subsequent actions starting at the action 308 are performed as already described, with the signal strength threshold having a value T, which may vary depending on the currently active NR frequency band. If the countdown timer is active, however, the signal strength threshold is increased by a ramp-up value D (i.e., T+D) in an action 328, wherein D is a preselected value such as +10 dBm, for example. The remaining actions of FIG. 3 are then performed, starting at the action 310, using this increased signal strength threshold T+D. This provides an override to the disabling effect of the countdown timer in cases where there is a significant increase in signal strength of the measured LTE frequency band.

Figure 4:
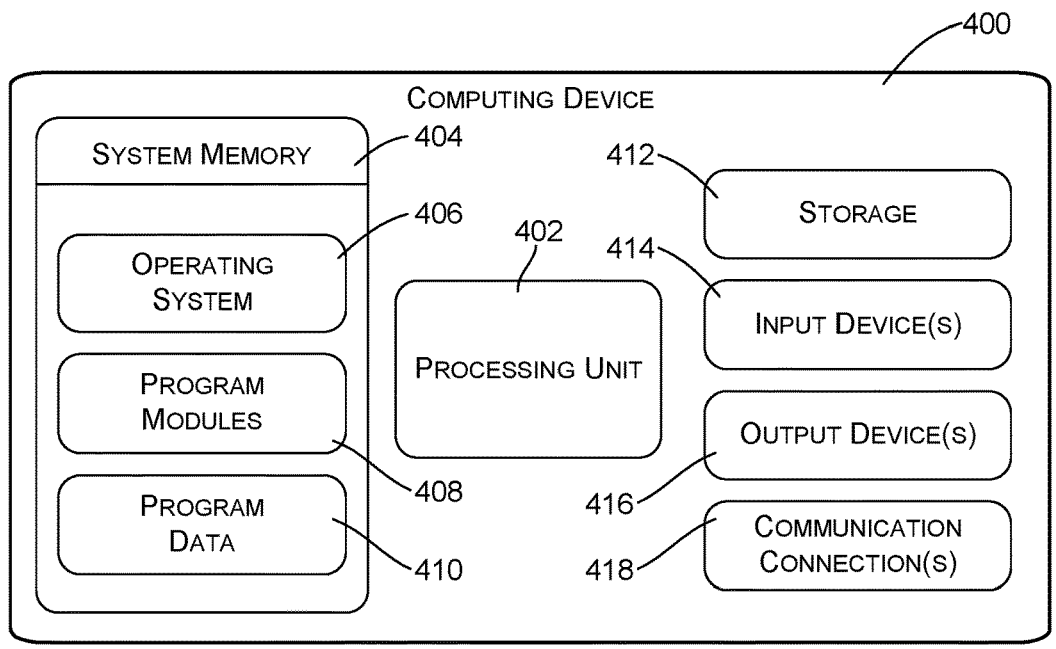
FIG. 4 is a block diagram of an example computing device that may be used to implement various functionality described herein.

FIG. 4 is a block diagram of an illustrative computing device 400 such as may be used to implement various components of a core network, a base station, and/or any servers, routers, gateways, administrative components, that may be used within a communications network. One or more computing devices 400 may be used to implement each of the base stations 106 and 108, for example. Similarly, one or more computing devices may be used to implement components of the 4G network core 102.

In various embodiments, the computing device 400 may include at least one processing unit 402 and system memory 404. Depending on the exact configuration and type of computing device, the system memory 404 may be volatile (such as RAM), non-volatile (such as ROM, flash memory, etc.) or some combination of the two. The system memory 404 may include an operating system 406, one or more program modules 408, and may include program data 410.

The computing device 400 may also include additional data storage devices (removable and/or non-removable) such as, for example, magnetic disks, optical disks, or tape. Such additional storage devices are illustrated in FIG. 4 as storage 412.

Non-transitory computer storage media of the computing device 400 may include volatile and nonvolatile, removable and non-removable media, implemented in any method or technology for storage of information, such as computer readable instructions, data structures, program modules, or other data. The system memory 404 and storage 412 are all examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 400. Any such non-transitory computer-readable storage media may be part of the computing device 400.

In various embodiment, any or all of the system memory 404 and storage 412 may store programming instructions which, when executed, implement some or all of the function functionality described above.

The computing device 400 may also have input device(s) 414 such as a keyboard, a mouse, a touch-sensitive display, voice input device, etc. Output device(s) 416 such as a display, speakers, a printer, etc. may also be included. The computing device 400 may also contain communication connections 418 that allow the device to communicate with other computing devices.

Figure 5:
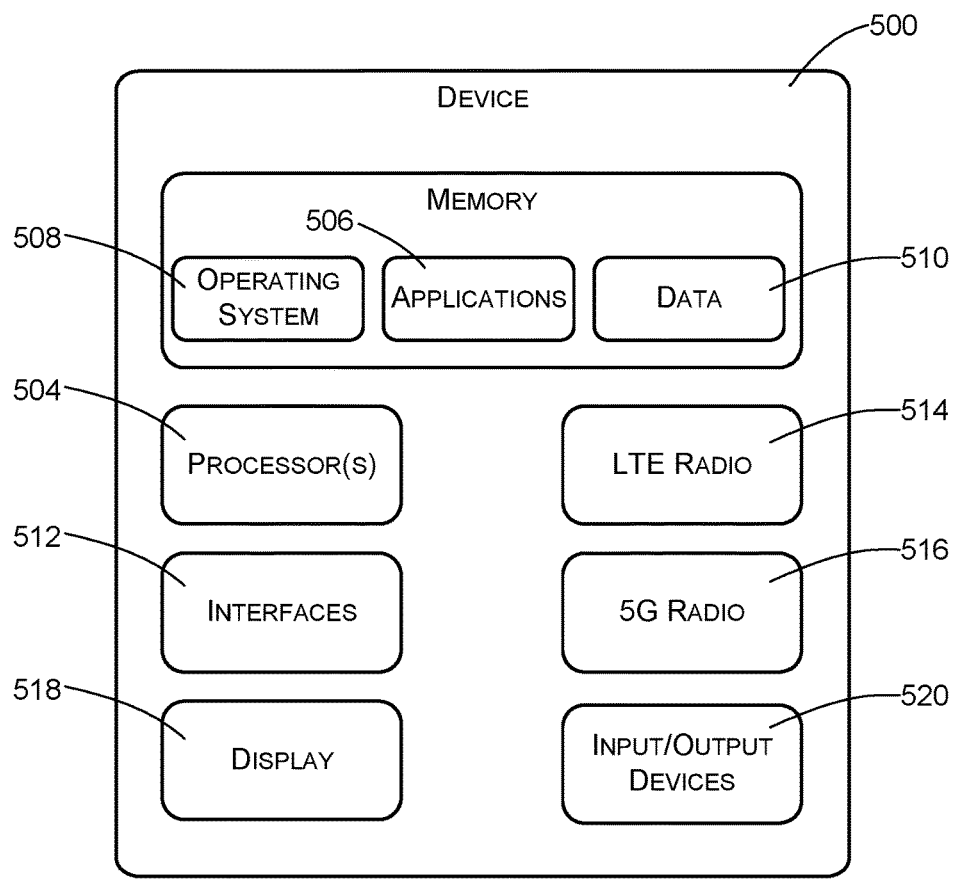
FIG. 5 is a block diagram of an example mobile communication device that may be used in conjunction with the techniques described herein.

FIG. 5 illustrates an example cellular communication device 500 that may be used in conjunction with the techniques described herein. Signal strength measuring and generation of A1 and A5 signal events may be performed by the device 500, for example. The device 500 is an example of the communication device 110, illustrating additional high-level components that are not shown in FIG. 1.

The device 500 may include memory 502 and a processor 504. The memory 502 may include both volatile memory and non-volatile memory. The memory 502 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 502 may include a SIM (subscriber identity module), which is a removable smart card used to identify a user of the device 500 to a service provider network.

The memory 502 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information. The memory 502 may in some cases include storage media used to transfer or distribute instructions, applications, and/or data. In some cases, the memory 502 may include data storage that is accessed remotely, such as network-attached storage that the device 500 accesses over some type of data communication network.

The memory 502 stores one or more sets of computer-executable instructions (e.g., software) such as programs that embody operating logic for implementing and/or performing desired functionality of the device 500. The instructions may also reside at least partially within the processor 504 during execution thereof by the device 500. Generally, the instructions stored in the computer-readable storage media may include various applications 506 that are executed by the processor 504, an operating system (OS) 508 that is also executed by the processor 504, and data 510.

In some embodiments, the processor(s) 504 is a central processing unit (CPU), a graphics processing unit (GPU), both CPU and GPU, or other processing unit or component known in the art. Furthermore, the processor(s) 504 may include any number of processors and/or processing cores. The processor(s) 504 is configured to retrieve and execute instructions from the memory 502.

The device 500 may have interfaces 512, which may comprise any sort of interfaces known in the art. The interfaces 512 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 500 may also have an LTE radio 514 and a 5G radio 516, which may be used as described above for implementing dual connectivity in conjunction with an eNodeB and a gNodeB. The radios 514 and 516 transmit and receive radio frequency communications via an antenna (not shown).

The device 500 may have a display 518, which may comprise a liquid crystal display (LCD) or any other type of display commonly used in telemobile devices or other portable devices. For example, the display 518 may be a touch-sensitive display screen, which may also act as an input device or keypad, such as for providing a soft-key keyboard, navigation buttons, or the like.

The device 500 may have input and output devices 520. These devices may include any sort of output devices known in the art, such as speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display. A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts.

Rather, the features and acts described above are disclosed as example forms of implementing the claims.

What is claimed is:

1. A method, comprising:
establishing a Long-Term Evolution (LTE) data connection between a cellular communication device and an LTE base station using a first LTE frequency band, wherein the LTE base station is associated with a New Radio (NR) base station for dual connectivity;
establishing an NR data connection between the cellular communication device and the NR base station using a first NR frequency band, wherein the LTE data connection and the NR data connection are used concurrently for dual connectivity with the cellular communication device;
receiving a signal event notification generated by the cellular communication device, wherein the signal event notification indicates that an LTE signal strength measured by the cellular communication device is greater than a threshold;
in response to receiving the signal event notification, releasing the NR data connection;
identifying a second NR frequency band that is (a) currently available for use by the cellular communication device and (b) has a greater bandwidth than the first NR frequency band; and
reestablishing the NR data connection using the second NR frequency band in response to the second NR frequency band having the greater bandwidth than the first NR frequency band.

2. The method of claim 1, wherein:
the LTE signal strength measured by the cellular communication device is of an LTE reference signal in the first LTE frequency band; and
the signal event notification comprises an LTE A1 event notification.

3. The method of claim 1, wherein:
the LTE signal strength measured by the cellular communication device is of an LTE reference signal in a second LTE frequency band; and
the second LTE frequency band and the second NR frequency band span at least a common frequency range; and the signal event notification comprises an LTE A5 event notification.

4. The method of claim 1, wherein identifying the second NR frequency band comprises instructing the cellular communication device to search for an NR signal in a sequence of NR frequency bands having successively decreasing bandwidths.

5. The method of claim 1, further comprising configuring the LTE data connection and the NR data connection to implement a Non-Standalone Architecture (NSA) of a 5th-Generation (5G) communication network.

6. A system, comprising:
one or more processors; and
one or more non-transitory computer-readable media storing computer-executable instructions that, when executed by the one or more processors, cause the system to perform actions comprising:
establishing a Long-Term Evolution (LTE) data connection between a cellular communication device and a first LTE base station using a LTE frequency band, wherein the LTE base station associated with a New Radio (NR) base station for dual connectivity;
establishing an NR data connection between the cellular communication device and the NR base station using a first NR frequency band, wherein the LTE data connection and the NR data connection are used concurrently for dual connectivity with the cellular communication device;
receiving a signal event notification indicating that an LTE signal strength measured by the cellular communication device and associated with a third frequency band has a signal strength that is greater than a threshold, the third frequency band being a next highest frequency band from the first NR frequency band;
in response to receiving the signal event notification, releasing the NR data connection; and
reestablishing the NR data connection using a second NR frequency band having a greater bandwidth than the first NR frequency band.

7. The system of claim 6, wherein the radio signal of the first radio access technology is in the first frequency band.

8. The system of claim 7, wherein the signal event notification comprises an A1 event notification.

9. The system of claim 6, wherein the radio signal of the first radio access technology is in a fourth frequency band that at least partially overlaps the third frequency band.

10. The system of claim 9, wherein the signal event notification comprises an A5 event notification.

11. The system of claim 6, the actions further comprising:
determining that the third frequency band is the second frequency band; and
in response to determining that the third frequency band is the second frequency band, preventing a subsequent releasing of the secondary data connection for at least a predetermined time period.

12. The system of claim 6, the actions further comprising configuring the primary data connection and the secondary data connection to implement a Non-Standalone Architecture (NSA) of a 5th-Generation (5G) communication network.

* * * * *